United States Patent [19]
Shouldice

[11] Patent Number: 5,983,451
[45] Date of Patent: *Nov. 16, 1999

[54] HEAVY DUTY DOUBLE-BALL PINLESS CASTER

[75] Inventor: William Ross Shouldice, Newmarket, Canada

[73] Assignee: Bestway Casters & Wheels Ltd., Newmarket, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,644

[22] Filed: Apr. 9, 1997

[30] Foreign Application Priority Data

Jun. 24, 1996 [CA] Canada ................... 2179802

[51] Int. Cl.$^6$ ................................................. B60B 33/00
[52] U.S. Cl. .................................................. 16/21
[58] Field of Search ................... 16/21, 22, 23, 16/37, 38, 18 R

[56] References Cited

U.S. PATENT DOCUMENTS

| | | | |
|---|---|---|---|
| 1,203,879 | 11/1916 | Janzen | 16/21 |
| 1,421,626 | 7/1922 | Warnock | 16/21 |
| 1,582,598 | 4/1926 | Hancock | 16/21 |
| 1,604,729 | 10/1926 | Weigel | 16/21 |
| 1,796,044 | 3/1931 | Nagy | 16/21 |
| 1,796,068 | 3/1931 | Van Der Meer | 16/21 |
| 1,838,678 | 12/1931 | Herold . | |
| 3,127,633 | 4/1964 | Schultz, Jr. | 16/21 |
| 3,606,503 | 9/1971 | Asberg et al. | 308/198 |
| 3,733,648 | 5/1973 | Asberg et al. | 16/21 |
| 4,316,305 | 2/1982 | Seaford | 16/21 |
| 4,494,271 | 1/1985 | Perlin et al. | 16/21 |
| 4,620,342 | 11/1986 | Haussels | 16/18 |
| 4,777,697 | 10/1988 | Berndt | 16/21 |
| 5,097,565 | 3/1992 | Shorey | 16/48 |
| 5,199,131 | 4/1993 | Harris | 16/21 |
| 5,461,753 | 10/1995 | Rounds | 16/21 |
| 5,479,677 | 1/1996 | Chong | 16/21 |

FOREIGN PATENT DOCUMENTS

| | | | |
|---|---|---|---|
| 0 265 390 | 4/1988 | European Pat. Off. | B60B 33/00 |
| 0 440 068 A1 | 8/1991 | European Pat. Off. | B60B 33/00 |
| 32 39 298 A1 | 4/1984 | Germany | B60B 33/00 |
| 33 00 527 A1 | 8/1984 | Germany | B60B 33/00 |
| 2 292 776 | 3/1996 | United Kingdom | F16C 35/04 |

*Primary Examiner*—Chuck Y. Mah
*Attorney, Agent, or Firm*—Neil H. Hughes; Ivor M. Hughes; Marcelo K. Sarkis

[57] ABSTRACT

A pinless caster assembly comprising a first substantially "T"-shaped part and a second substantially ring-shaped solid part, said first and second parts interfitting with bearing elements and when interfit providing races for the bearing elements and the caster assembly, said first and second part being machined from solid material of predetermined metallurgical characteristics, said first part having disposed therewith a first one-half raceway, for receiving load-carrying bearings in use, and a second one-half raceway for receiving swivel bearings in use, said second part having disposed therewith a third one-half raceway for receiving load-carrying bearings in use for mating with the first one-half raceway disposed with the first part and thereby providing a load-carrying race of the caster assembly, said second part also having disposed therewith a fourth one-half raceway for receiving swivel bearings in use and for mating with the second one-half raceway disposed with the first part and thereby providing a swivel race of the caster assembly, wherein the first and second parts interfit to provide the caster assembly, said caster assembly having provided therewith an opening extending into the swivel race to enable bearings to be loaded into the caster raceway in use, said opening being closed by a closure so as not to interfere with the abilities of the bearings contained within the raceway, wherein the raceway formed from interfitting the first and third one-half raceways disposed with the first and second parts contains the load-carrying bearings for the caster assembly, and wherein the raceway formed from interfitting the second and fourth one-half raceways disposed with the first and second parts contains the swivel bearings for the caster assembly, the caster assembly so formed having substantial resistance to wear and fatigue as required in heavy duty applications.

13 Claims, 8 Drawing Sheets

HEAVY DUTY DOUBLE-BALL PINLESS CASTER

FIELD OF INVENTION

This invention relates to double-ball casters and finds particular application to situations requiring assemblies which are resistant to wear and fatigue such as those assemblies which are subjected to heavy loading. In a preferred embodiment, the invention includes a two-part assembly machined from rounded bar stock and case hardened.

BACKGROUND OF THE INVENTION

Within the art there exists numerous caster designs. Some of the designs for casters provide for the swiveling of a wheel attached to the frame of, for example, a cart or the like. Typically, the caster includes at least one race within which ball bearings are provided. With these types of casters, the ball bearing must both support the load from the frame and allow for the swiveling of the wheel in relation to the frame. Depending on the design of the caster, there may be a great deal of wear on the ball bearings affecting the life of the caster. Inventors therefore have been working to improve the life of the casters by providing various designs to better distribute the load evenly on the ball bearing circumference. An example of such a patent is U.S. Pat. No. 4,316,305 which offsets the loading axis of the ball bearing to improve caster life. However, such a caster still attempts to provide both the load-carrying ability and the swiveling ability of the caster via one set of ball bearings. The portions making up the caster include mating parts cast or formed by some alternative metal working process. U.S. Pat. No. 4,316,305 teaches an improved caster assembly utilized in an inverted disposition for its components. The fundamental improvement with this particular patent is the offsetting of the loading through the bearing elements 28.

Also within the art, there are various structures which attempt to separate the load carrying bearings and the swivel bearings by providing a double-ball caster with one set of bearings providing the load carrying ability, and the other set of bearings providing the swivel capability.

An example of such a structure is found in U.S. Pat. No. 4,777,697. Within the teachings of this patent, an outer load-carrying bearing set 3 is provided and an inner swivel or pivot-bearing set 4 is provided. A pin 8, or a king pin as it is known in the trade, secures the two portions together as is best seen in FIG. 3. One of the drawbacks of the design is the actual provision of the pin itself. Such pins normally will not fair well for casters supporting heavy loads. Typically, for such capacities of up to 30 tons, a bolt of very, very large diameter would have to be provided which would render the design economically unfeasible.

U.S. Pat. No. 3,127,633 is another example of a design including a king pin. The design incorporates hardened steel bearings operating in hardened races. The yoke is stamped or pressed from suitable sheet material such as low carbon sheet steel. An upper race portion 62 and a lower race portion 66 are therefore provided. U.S. Pat. No. 5,461,753 also describes a double-ball caster including a king pin 28 therewith.

U.S. Pat. No. 1,838,678 teaches a heavy-duty caster including auxiliary side thrust bearings provided within recesses having a general FIG. 8 configuration. The unit is fairly compact in design which is held together with a nut 46. This unit therefore will be successfully loaded up to the maximum load-carrying ability of the threaded fasteners.

Another example of a heavy duty caster assembly is found in German Patent Application No. DE 3,239,298 which teaches as best as can be determined a mass-produced assembly also including a double-ball arrangement including a pin for interconnecting the portions together.

Some designs for casters having a double-ball configuration have attempted to eliminate the need for a king pin altogether. U.S. Pat. No. 4,620,342 and European Patent No. 440,068 deal with similar structures in relation to a double-ball caster wherein the outer race is welded to a first portion of the fork, and the inner race is welded to the trolley. Both patents describe structures which do not incorporate a king pin per se. U.S. Pat. No. 4,620,342 includes fasteners at 16 which engage with the bearing plate 2. As best as can be determined, the European patent to the same Assignee does not include fasteners whatsoever. These designs incorporate the ability of bending plates over the free end of the swivel bearing cup by means of appropriate forming-over tools. None of the portions are machined from a solid bar stock.

German Patent Application No. 3,300,527 describes a caster support having a two-part construction with a double-bearing race. The base support provided at 1 includes mounting openings to secure to a frame. The center portion of the item includes a substantially hook shaped portion 4 and 5 for capturing therebetween the ball bearings 10 and 11 separated by the flange portion 8 provided near the end of the horn affixed to the wheel 9. Such a structure is manufactured by mass production techniques by stamping the various portions required. As best as can be determined, no other structures are utilized for fastening the two-part construction.

Another example of a simpler arrangement is found in Great Britain Patent Application No. 2,292,776 wherein a caster fork is attached to a wheel formed of two parts, a leg portion and a body portion. The two portions are clamped together by means of screws or bolts with the screws or bolts extending substantially in a horizontal direction. In this manner, the loading is not transmitted through the screws or bolts. Specifically, FIGS. 6 and 7 illustrate a double-race design. The caster is assembled once the two parts are formed from die cast metal in one embodiment. The assembly may be easily disassembled as well for maintenance purposes.

U.S. Pat. No. 3,606,503 describes a low profile caster assembly wherein the inner and outer rings of the assembly are completely formed and secured to their respective support members by, for example, welding, soldering or gluing. The rolling elements are inserted through an opening which opens into the annular space between the races provided. The rings may be machined and formed automatically and tempered. A plug element is provided, preferably formed from plastic material and snapped into position to cover the access opening through which the rolling elements are fed.

U.S. Pat. No. 5,097,565 also teaches a caster assembly as best seen in FIG. 3 which includes a plug 60 to allow feeding of the ball bearings into the compact package.

U.S. Pat. No. 5,479,677 teaches an improved caster design as best seen in FIG. 2 which includes a cap member, a ring member and a rotary member which cooperate to confine a plurality of steel balls which are protected from water penetration. The design includes four fasteners for fastening through the assembly and includes an inner and outer ball bearing set.

U.S. Pat. No. 5,199,131 describes a caster assembly made up of a stem and a ball bearing retainer formed from reinforced plastic with the components being ultrasonically welded to the stem and retainer combination unit. The material is preferably glass-filled nylon. This unit, of course, will not withstand great loading even though the design incorporates a double-ball race.

U.S. Pat. No. 3,733,648 describes a caster assembly made from sheet metal parts including a single row of ball bearings wherein the two rings forming the race are restrained by deformation, such as folding the material of the housing and the form respectively. Another example of a formed structure is found in European Patent Application No. 265,390 wherein a fixing late 12 is fastened with regard to a base. Two rings of ball bearings are provided with the first ring of bearings having a larger diameter than the second ring of all bearings. The portions provided as best seen in FIG. 2 interlock to trap the ball bearings therebetween and are fastened in the sense that the portion 26a, an extension of portion 26 is riveted in final position. This structure does not require a pin therefor to hold the structure together.

In reviewing the prior art therefore in total, most of the structures are formed from either casting or sheet metal forming techniques. Nowhere within the prior art is there found a simple caster design wherein the caster parts are manufactured from suitable materials capable of being formed to a predetermined resistance to wear and fatigue by any suitable method wherein said portions interfit to provide a much improved caster assembly containing bearings provided for carrying the load applied to the caster and separate bearings being provided for the swiveling of the caster separate from the load-carrying bearings, wherein the races for the bearings in one embodiment are disposed at ninety degrees to one another.

It is therefore an object of this invention to provide a simple heavy duty caster and a method of manufacturing thereof.

It is a further object of this invention to provide a caster assembly which will accept loads of up to 30 tons.

It is a yet further object of this invention to provide a caster assembly which is economical to manufacture.

It is yet a further object of the invention to provide a caster assembly manufactured from suitable materials resistant to wear and fatigue when formed.

Further and other objects of the invention will become apparent to those skilled in the art when considering the following summary of the invention and the more detailed description of the preferred embodiments illustrated herein.

SUMMARY OF THE INVENTION

The caster assembly and the method of manufacturing said caster assembly may include suitable materials of any derivation. Many engineered plastics utilized today have acceptable resistance to wear and fatigue to be utilized in the caster assembly both for the first and second parts described below and for the bearing elements therein. Further, ceramics have been found to have acceptable performance characteristics as well for these parts and/or bearing elements. Various metals such as steel or the like are also acceptable. Specifically, at least the surface of the material must provide good resistance to wear and fatigue. This may be accomplished with steel, for example by case hardening or the like. No limitation is meant to be implied by the following summaries of the invention as to the types of suitable materials unless specified as in the preferred embodiments.

According to one aspect of the invention, there is provided a caster assembly comprising a first part and a second part, said first and second part interfitting with bearing elements and when interfit providing the races for the bearing elements and the caster assembly, preferably said first and second part being fixed to and preferably welded to a horn assembly and a top plate respectively, said first and second part being formed, and preferably machined from solid core bar stock of predetermined metallurgical characteristics such as low carbon content steel (10/26, or 10/45) (preferably having a hardness of 55 c on the Rockwell scale after being heat treated, said heat treatment including the steps of forming and preferably machining the part or alternatively forming the part by known techniques such as die casting or drop forging or the like from in one embodiment mild steel and subsequently case hardening the surface by exposing the surface to a carbonitriding process or the like), said first part having disposed therewith a first one-half raceway, preferably disposed substantially in a horizontal plane, for receiving load-carrying bearings in use, and a second one-half raceway, preferably disposed substantially in a vertical plane, for receiving swivel bearings in use, said second part having disposed therewith a third one-half raceway, preferably disposed substantially in a horizontal plane, for receiving load-carrying bearings in use for mating with the first one-half raceway disposed with the first part and thereby providing the load-carrying race of the caster assembly, said second part also having disposed therewith a fourth one-half raceway, preferably disposed substantially in a vertical plane, for receiving swivel bearings in use and for mating with the second one-half raceway disposed with the first part and thereby providing the swivel race of the caster assembly, wherein the first and second parts interfit to provide the caster assembly, said caster assembly having provided therewith an opening extending into the swivel race to enable bearings to be loaded into the caster raceway in use, said opening being closed by a closure such as an acceptable plug, welding, fastener or the like so as not to interfere with the abilities of the bearings contained within the raceway, wherein the raceway formed from interfitting the first and third one-half raceways disposed with the first and second parts contains the load-carrying bearings for the caster assembly, and wherein the raceway formed from interfitting the second and fourth one-half raceways disposed with the first and second parts contains the swivel bearings for the caster assembly, which bearings are preferably manufactured from materials resistant to wear and fatigue such as hardened steel, for example carbon 1000 or stainless steel or any material of compatible hardness with the material from which the caster is manufactured, the caster assembly so formed having substantial resistance to wear and fatigue. Preferably in one embodiment an opening may be drilled and tapped for a grease fitting extending into the caster assembly, and preferably to proximate the boundary between the first and second parts when interfit.

According to another aspect of the invention, there is provided a method of manufacturing a pinless caster comprising the steps of:

1. selecting the appropriate material, and preferably solid-core bar stock or tube, preferably the material being capable of being heat treated to a suitable hardness preferably of 55 c on the Rockwell scale after hardening, in one embodiment the material being low carbon content steel such as 10/26 or 10/45 or the like,
2. forming a first part and preferably machining the first part from said selected materials, or alternatively manufacturing the first part by other known techniques such as die casting or drop forging or the like,
3. forming and preferably machining a first one-half load-carrying raceway extending in substantially a horizontal plane within the first part, 4. forming and preferably machining a second one-half swivel raceway extending in substantially a vertical plane within the first part,
5. forming and preferably machining the second part from the selected materials so as to allow interfitting of the second part with the first part, or alternatively manufacturing the second part from known techniques such as die casting or drop forging, or the like.
6. forming and preferably machining a third one-half load-carrying raceway extending in substantially a horizontal plane within the second part,
7. forming and preferably machining a fourth one-half swivel raceway extending in substantially a vertical plane within the second part,
8. ensuring that the first and second parts interfit so that the first and third horizontally disposed load-carrying one-half raceways and the second and fourth vertically disposed swivel one-half raceways compatibly align to form first and second load-carrying and swivel-bearing raceways.
9. forming and preferably drilling and tapping a first opening into the swivel bearing raceway,
10. providing a closure and preferably a plug for said first opening,
11. preferably forming, for example drilling and tapping a second opening within the caster through the material thereof, preferably to proximate the boundary between the first and second parts when interfit,
12. preferably when necessary subjecting the first and/or second parts to a hardening process and preferably a case hardening process such as a carbonitriding process or the like,
13. preferably fastening and in one embodiment threading a grease fitting into the second opening above mentioned,
14. placing bearings of predetermined hardness within the load-carrying bearing raceway prior to interfitting the first part with the second part so as to mate the one-half raceways previously formed,
15. feeding bearings through the first opening into the swivel-bearing raceway,
16. sealing the first opening with the closure, wherein the caster so formed is held together without the need of a pin thereby providing for the much improved load-carrying abilities of the caster with the load-carrying bearings and the swiveling ability of the caster with the separate swiveling bearings.

According to yet another primary aspect of the invention, there is provided a caster assembly comprising a first part and a second part, said first and second part interfitting with bearing elements and providing the bearing races and the caster assembly, preferably said first and second part being fixed to and preferably welded to a horn assembly and a top plate respectively, said first and second part being manufactured, or formed from suitable material, and preferably machined (preferably by programmable machining) preferably from solid core bar or tube stock, of predetermined metallurgical characteristics, such as low carbon content steel (10/26, or 10/45) (preferably having a hardness of 55 c on the Rockwell scale after being heat treated, said heat treatment including the steps of forming or preferably machining the part, or alternatively forming the part by known techniques such as die casting or drop forging or the like from in one embodiment mild steel and subsequently case hardening the surface by exposing it to a carbonitriding process or the like), said first part having a top and a bottom and having disposed proximate the top thereof a first portion having a first diameter and a top and a bottom, said first part having disposed therewith extending from proximate the bottom of the first portion to the bottom of the first part a second portion having a second diameter smaller than the first diameter of the first portion, said first portion having disposed proximate the bottom thereof intermediate the diameter of the first portion and the diameter of the second portion a one-half raceway extending upwardly from the bottom of the first portion, (in one embodiment an opening may be drilled and tapped for a grease fitting from the top of the first portion and extending to proximate the boundary between the first and second part proximate the diameter of the second portion of the first part and an inner diameter of the second part when assembled), said second portion having a top and a bottom and having disposed intermediate the top and the bottom thereof a one-half raceway extending around the circumference of the second portion toward the center thereof, said second part having a substantially ring-like configuration having a top, a bottom and an inner and outer diameter, said top of said second part having disposed intermediate its inner and outer diameter an arcuate one-half raceway for mating with the arcuate one-half raceway disposed proximate the bottom of the first portion of the first part, said second part also having disposed therewith the top and bottom thereof adjacent the inner diameter thereof and formed at a predetermined location to mate with the one-half raceway of the second portion of the first part, a one-half raceway extending within the material around the interior of the inner diameter of the second part and extending toward the perimeter of the second part, (in one embodiment an opening may be drilled and tapped for a grease fitting from the top of the first portion and extending to proximate the boundary between the first and second part proximate the diameter of the second portion of the first part and the inner diameter of the second part when assembled), said second part having provided therewith an opening extending from the outer diameter to the inner diameter of the second part and interconnecting with the one-half race provided proximate the inner diameter of the second part to enable bearings to be loaded into the caster raceway in use, wherein the raceway having the greater diameter provided when the first and second parts are interfit contains the load-carrying bearings for the caster assembly, which are preferably hardened steel such as carbon 1000 or stainless steel of compatible hardness with the material from which the caster is manufactured, wherein when the first and second part are assembled, swivel bearings are loaded through the opening in the second part within the smaller diameter raceway formed by the mating first and second parts, said opening being closed by a closure, for example by an acceptable plug, welding, fastener or the like, so as not to interfere with the abilities of the bearings contained within the swivel raceway, the caster assembly so formed having substantial resistance to wear and fatigue.

According to yet another aspect of the invention, there is provided a method of manufacturing a pinless caster comprising the steps of:
1. selecting the appropriate material, and preferably solid-core bar stock or tube, preferably the material being capable of being heat treated to a suitable hardness preferably of 55 c on the Rockwell scale after hardening, in one embodiment the material being low carbon content steel such as 10/26 or 10/45 or the like,
2. forming a first part and preferably machining the first part from said selected materials, or alternatively manufacturing the first part by other known techniques such as die casting, drop forging or the like, 3. forming and preferably machining said first part to include a first portion having a first diameter and a second portion having a second smaller diameter wherein the first portion having the first diameter is disposed proximate one end of the first part and the second portion having the second smaller diameter is disposed from proximate the other end of the first part to the bottom of the first portion of the first part, 4. forming a one-half raceway in the second portion of the first part between the ends thereof, 5. forming a one-half raceway proximate the bottom of the first portion of the first part intermediate the first and second diameters, 6. forming and preferably machining the second part from the selected materials such as solid core or tube, by forming or machining or sizing an opening through the center thereof thus forming a compatible inner diameter slightly greater than the smaller diameter of the second portion of the first part so as to allow interfitting of the opening in the second part with the second portion of the first part, 7. forming a one-half annular raceway upon the top of the second part, 8. forming a one-half annular raceway within the material adjacent the inner diameter of the second part intermediate the top and bottom thereof, 9. ensuring that the first and second parts interfit so that the one-half raceways compatible combine to form first and second load-bearing and swivel-bearing raceways, 10. forming and preferably drilling and tapping a first opening within the first part through the material thereof to proximate the boundary between the first and second part proximate the diameter of the second portion of the first part and the inner diameter of the second part when assembled, 11. forming and preferably drilling and tapping a second opening into the one-half raceway formed with the second part within the material adjacent the inner diameter thereof, 12. preferably when necessary subjecting the first and/or second parts to a hardening process and preferably a case hardening process such as a carbonitriding process or the like, 13. fastening and preferably threading a grease fitting into the first opening above mentioned, 14. providing a closure for said second opening, 15. placing bearings of predetermined compatible hardness within the one-half race disposed proximate the top of the second part, 16. placing the first part within the second part so as to mate the one-half raceways previously formed thus providing a load-bearing raceway, 17. feeding bearings of predetermined compatible hardness through the second opening into the swivel bearing raceway disposed between the first and second part intermediate the top and bottom of the caster assembly, 18. sealing the second opening with the provided closure, wherein the caster so formed is held together without the need of a pin thereby providing for a much improved wear resistance and load-carrying abilities of the caster, with the load-carrying bearings and the swiveling ability of the caster with the separate swiveling bearings.

According to a primary aspect of the invention there is provided a caster assembly comprising a first part and a second part, said first and second part interfitting with bearing elements thereby providing the caster assembly, said first and second part being formed from material of predetermined characteristics which is capable of resisting wear and fatigue, said first part having disposed therewith a first one-half raceway disposed substantially in a first plane for receiving load-carrying bearings in use, and a second one-half raceway disposed substantially in a second plane disposed at substantially 90 degrees to the first plane for receiving swivel bearings in use, said second part having disposed therewith a third one-half raceway disposed substantially in the first plane for receiving load-carrying bearings in use for mating with the first one-half raceway disposed with the first part and thereby providing the load-carrying race of the caster assembly, said second part also having disposed therewith a fourth one-half raceway disposed substantially in a second plane for receiving swivel bearings in use and for mating with the second one-half raceway disposed with the first part and thereby providing the swivel race of the caster assembly, wherein the first and second parts interfit to provide the caster assembly, said caster assembly having provided therewith an opening extending into the swivel race to enable bearings to be loaded into the caster raceway in use, said opening being closed by an acceptable closure such as a plug, weld, fastener or the like so as not to interfere with the abilities of the bearings contained within the raceway, the caster assembly so formed having substantial resistance to wear and fatigue.

According to another aspect of the invention, there is provided a method of manufacturing a pinless caster comprising the steps of:

1. selecting the appropriate material capable of being manufactured to a predetermined resistance to wear and fatigue, 2. forming a first part from said selected materials, 3. forming a first one-half load carrying raceway extending in substantially a first plane within the first part, 4. forming a second one-half swivel bearing raceway extending in substantially a second plane disposed at substantially 90 degrees to the first plane within the first part, 5. forming a second part from the selected materials so as to allow interfitting of the second part with the first part when assembled, 6. forming a third one-half load-carrying raceway extending in substantially the first plane within the second part, 7. forming a fourth one-half swivel bearing raceway extending in substantially the second plane within the second part, 8. ensuring that the first and second parts interfit so that the first and third load-carrying one-half raceways and the second and fourth swivel bearing one-half raceways compatibly align to form first and second load-bearing and swivel-bearing raceways, 9. forming a first opening within the caster through the material thereof to proximate the interface between the first and second part when interfit, 10. forming a second opening into the swivel bearing raceway, 11. if necessary surface treating said first and second parts once formed depending on the selected materials, so as to improve the resistance to wear and fatigue, 12. providing a closure for said second opening, 13. placing bearings of predetermined resistance to wear and fatigue within the load-carrying raceway prior to interfitting the first part with the second part so as to mate the one-half raceways previously formed, 14. feeding bearings through the second opening into the swivel bearing raceway, 15. sealing the second opening with the closure, 16. preferably fastening a grease fitting into the first opening above mentioned, wherein the caster so formed is held together without the need of a pin thereby providing for the much improved load-carrying abilities of the caster with the load-carrying bearings and the swiveling ability of the caster with the separate swiveling bearings.

DETAILED DESCRIPTION OF THE PREFERRED EMBODIMENTS

Figure 1:
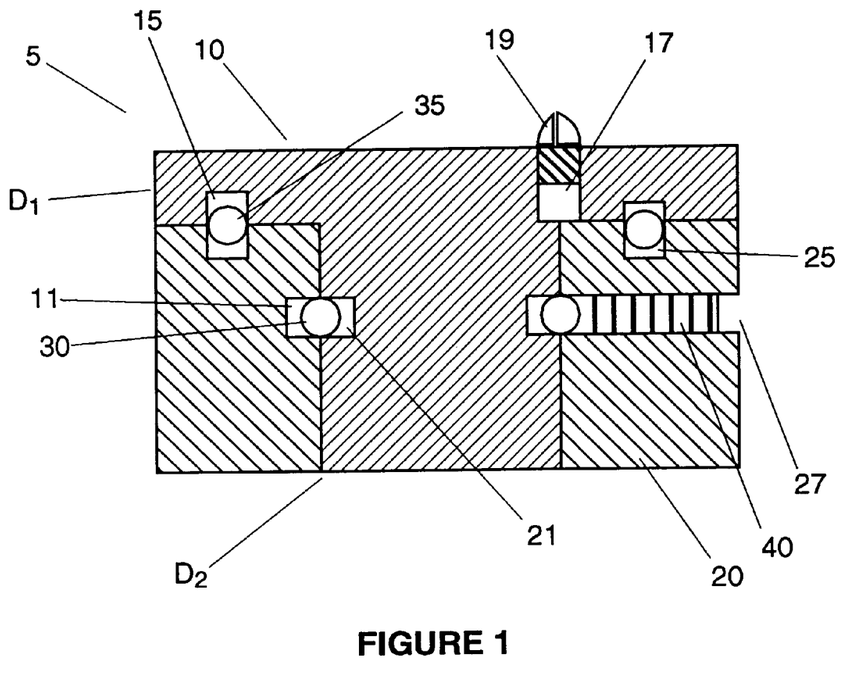
FIG. 1 is a side view of the caster assembly shown in schematic cross section and illustrated in a preferred embodiment of the invention.

Referring generally to the drawings, there is illustrated a caster assembly 5 including a first part 10 and a second part 20. The first part 10 appears to be of general T shape in configuration when viewed in cross section as seen in FIG. 1. In fact it looks a little like a flat-top mushroom. The second part 20 is of general ring-shaped configuration as best seen in relation to FIGS. 6 and 7. Part 20 therefore has an inner diameter just slightly greater than D2 and an outer diameter of D1. The first part has a portion T1 having the greater diameter D1 located near the top of portion 10. The bottom portion T2 extends from the bottom of portion T1 downwardly away therefrom to the bottom of part 10. The diameter of portion T2 is D2.

Figure 5:
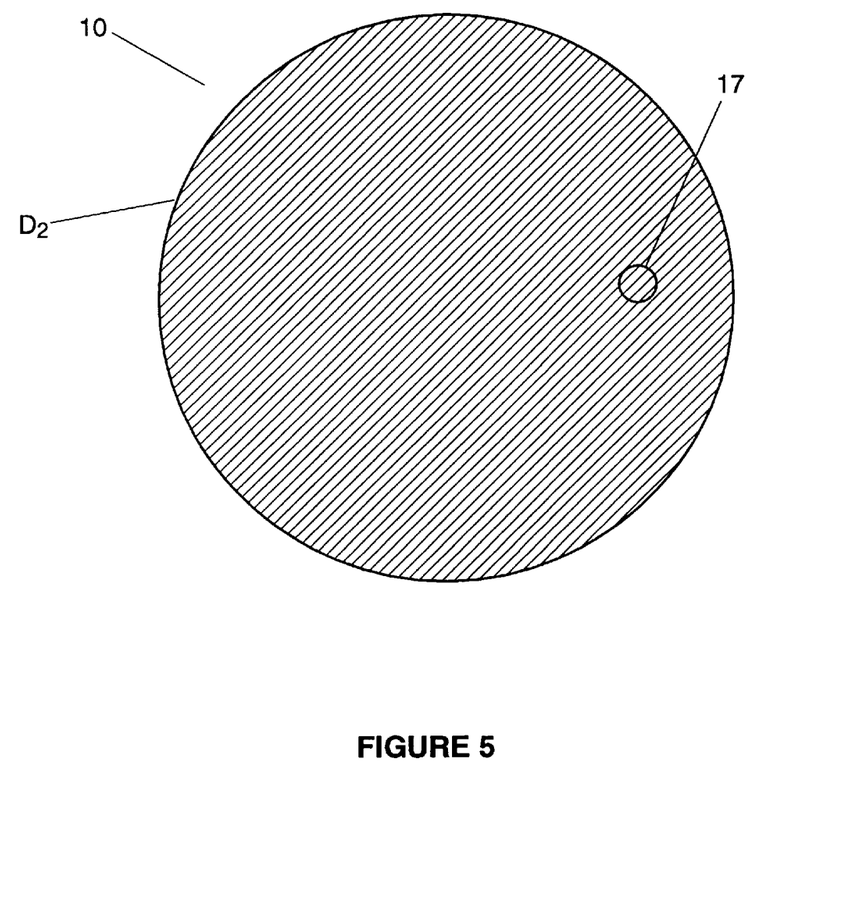
FIG. 5 is a top view of the first part illustrated in FIG. 2.
Figure 6:
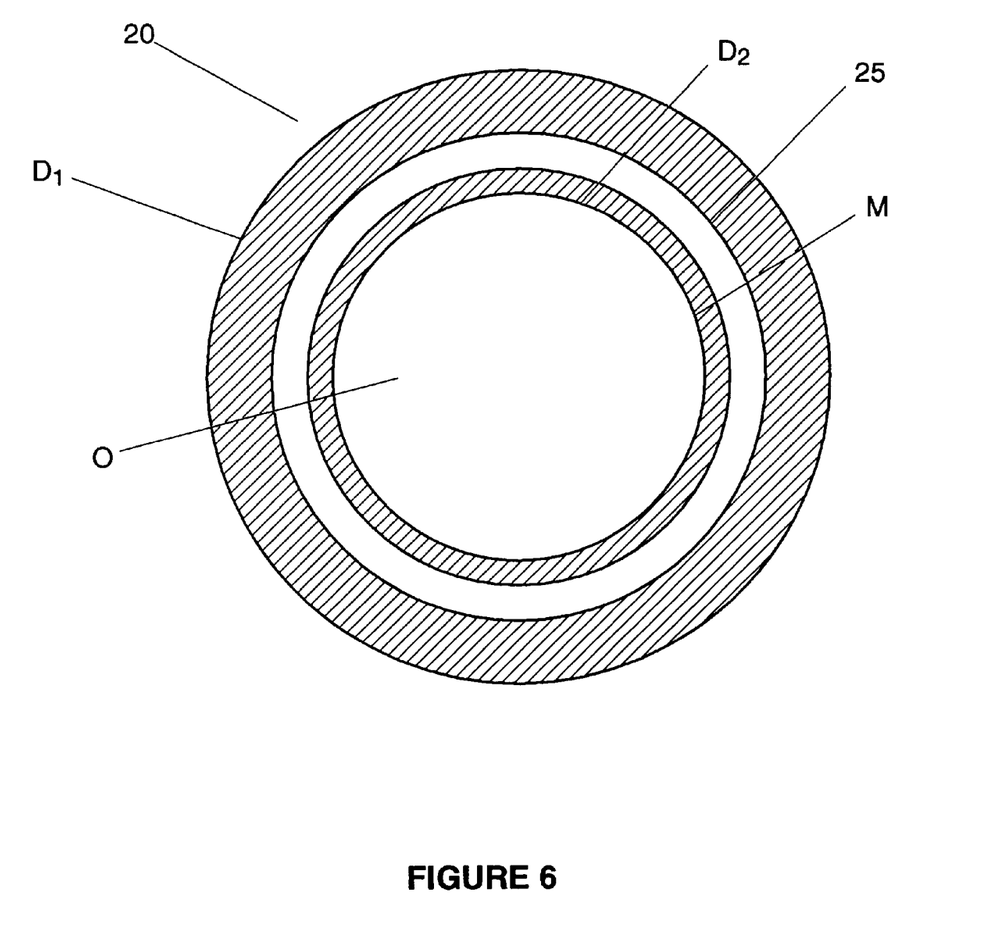
FIG. 6 is a top view of the second part illustrated in FIG. 3.
Figure 7:
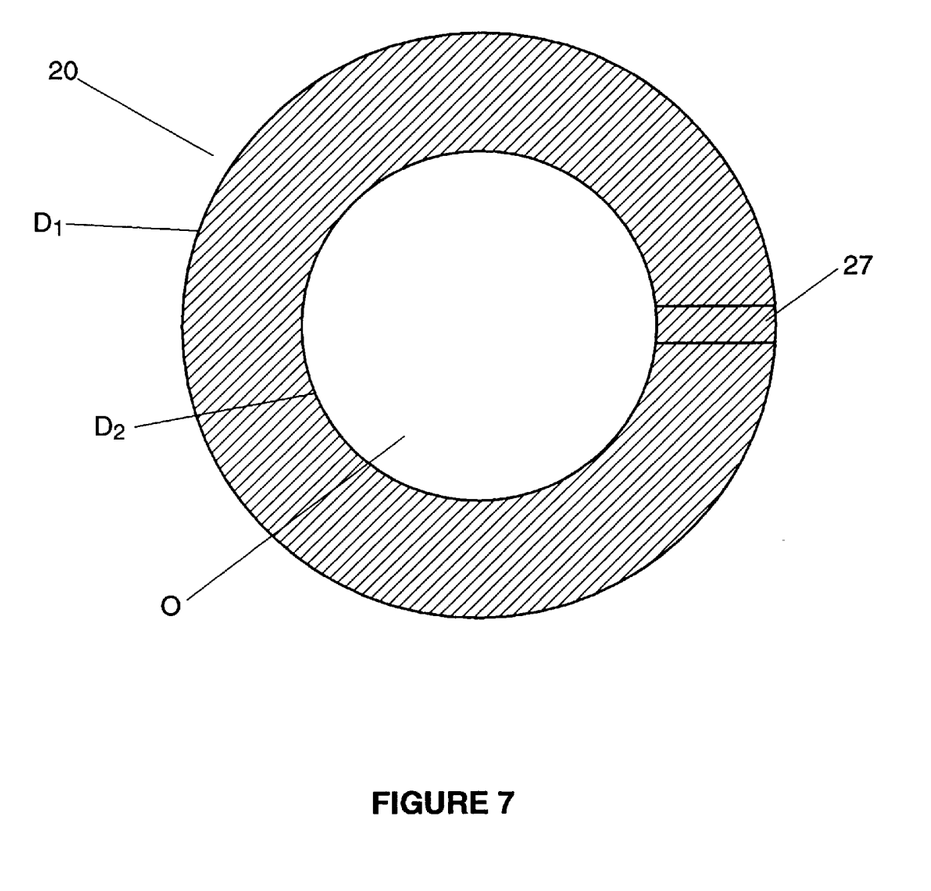
FIG. 7 is a bottom view of the second part illustrated in FIG. 3.

In use, the portion T2 is inserted within the opening O seen in FIGS. 6 and 7 in order to assemble the caster. When forming the portion 10, an opening is drilled and tapped at 17, as best seen in FIG. 5, to include a grease fitting 19 within that opening. The opening 17 is in line with the boundary between parts 10 and 20 as best seen in FIG. 1. A one-half raceway 15 is located between D1 and D2. Similarly, a compatible one-half raceway 25 is formed on the top of the ring shaped portion 20 in alignment with the one-half race of portion T1.

Portion T2 is also formed with an annular race extending around the circumference of diameter D2 of the portion. Similarly, the material surrounding the opening O of ring portion 20 includes half a race formed therewith when machined which will compatibly align with the half race provided in portion T2. An opening 27 is provided through to the race 21 in order to load the ball bearings into the race 11/21 when assembled. A plug 40 is provided to seal the opening 27 once the ball bearings are loaded therein to prevent removal thereof. Alternate bearing elements may also be used as is well known.

Figure 2:
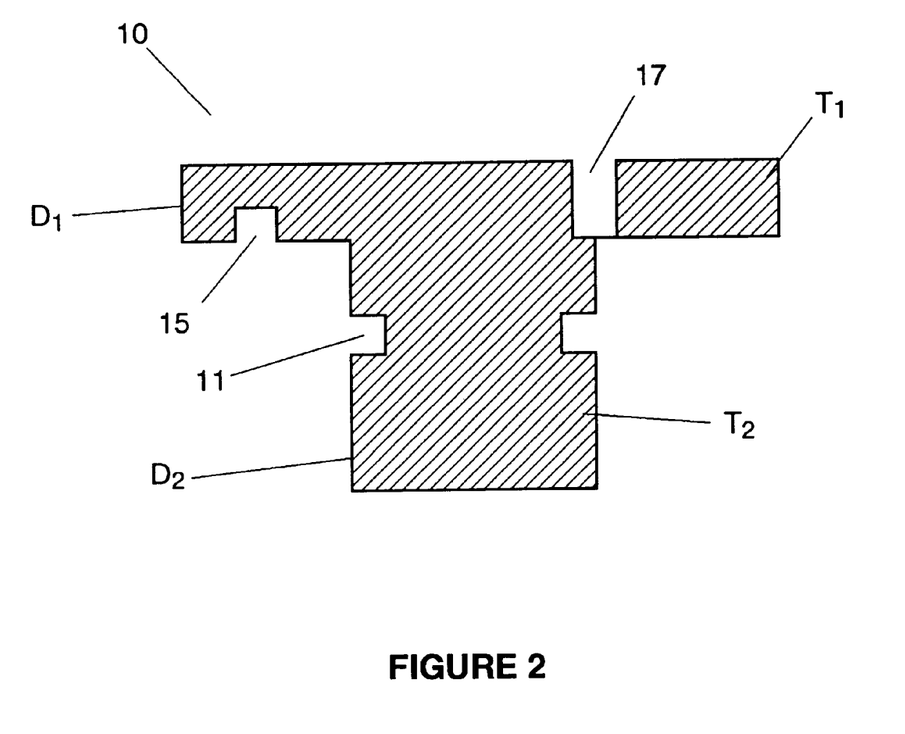
FIG. 2 is a side view of the first part of the caster assembly shown in cross section and illustrated in a preferred embodiment of the invention.
Figure 3:
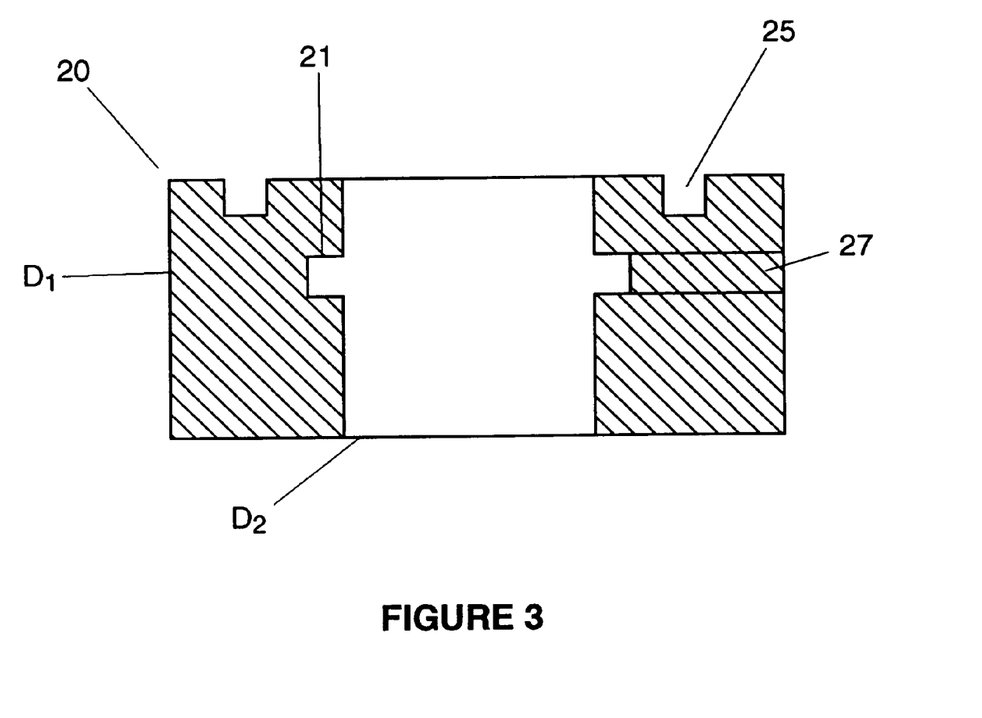
FIG. 3 is a cross-sectional side schematic view of the second part making up the caster assembly and illustrated in a preferred embodiment of the invention.
Figure 4:
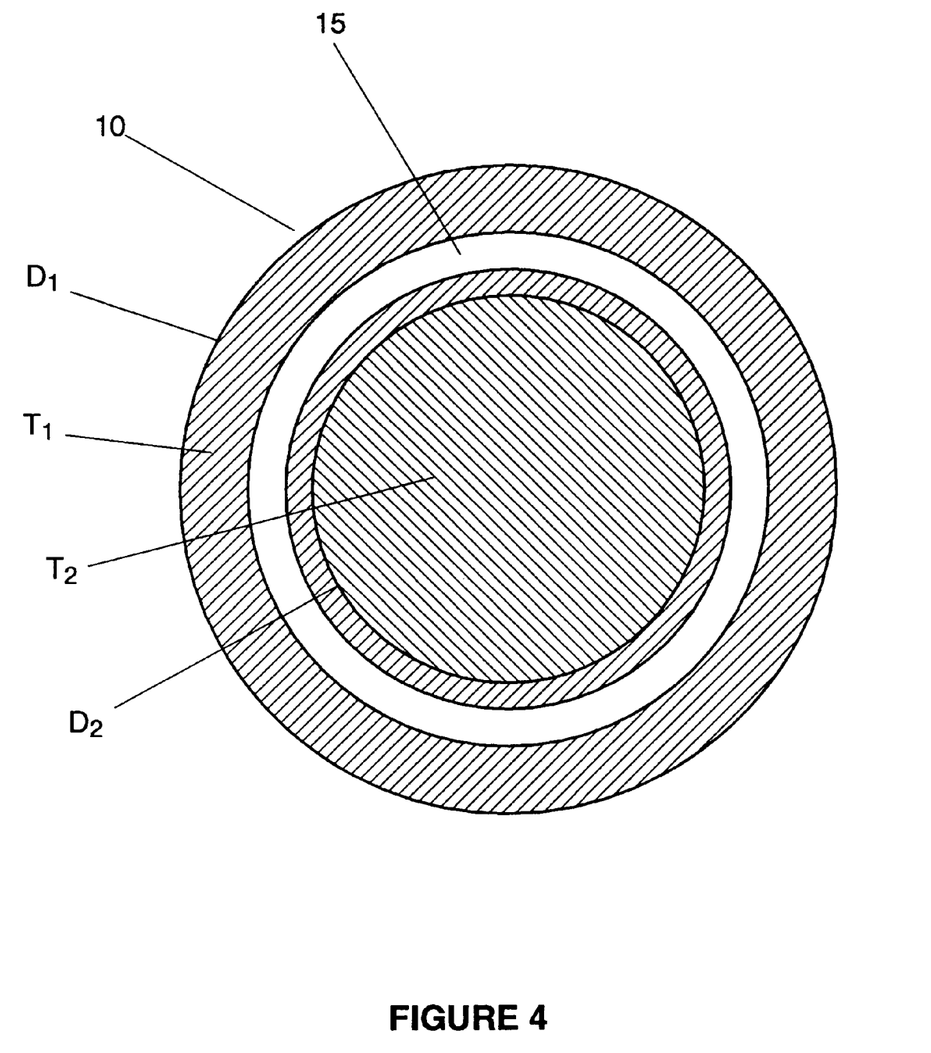
FIG. 4 is a bottom view of the first part illustrated in FIG. 2.

As the two portions 10, as seen in FIG. 2, and 20 as seen in FIG. 3 are therefore joined together, load-carrying ball bearings are inserted within the races 25 disposed on the top of portion 20. Portion T2 is then inserted within opening O of portion 20 to capture the ball bearings 35 within the races 15/25. The swivel ball bearings then are loaded into the raceway created by races 11/21 until fully loaded and the plug 40 (preferably a nyloc set screw) is placed in position. Alternatively, the opening may be welded shut, but replacement of the ball bearings would be impossible. The grease fitting 19 is also placed within opening 17. The caster assembly 5 is now complete and includes a much greater load-carrying capacity and resistance to wear and fatigue than known double-ball casters including or excluding king pins. Since the present structure 5 lacks a king pin, much greater load carrying capacities may be achieved.

Figure 8:
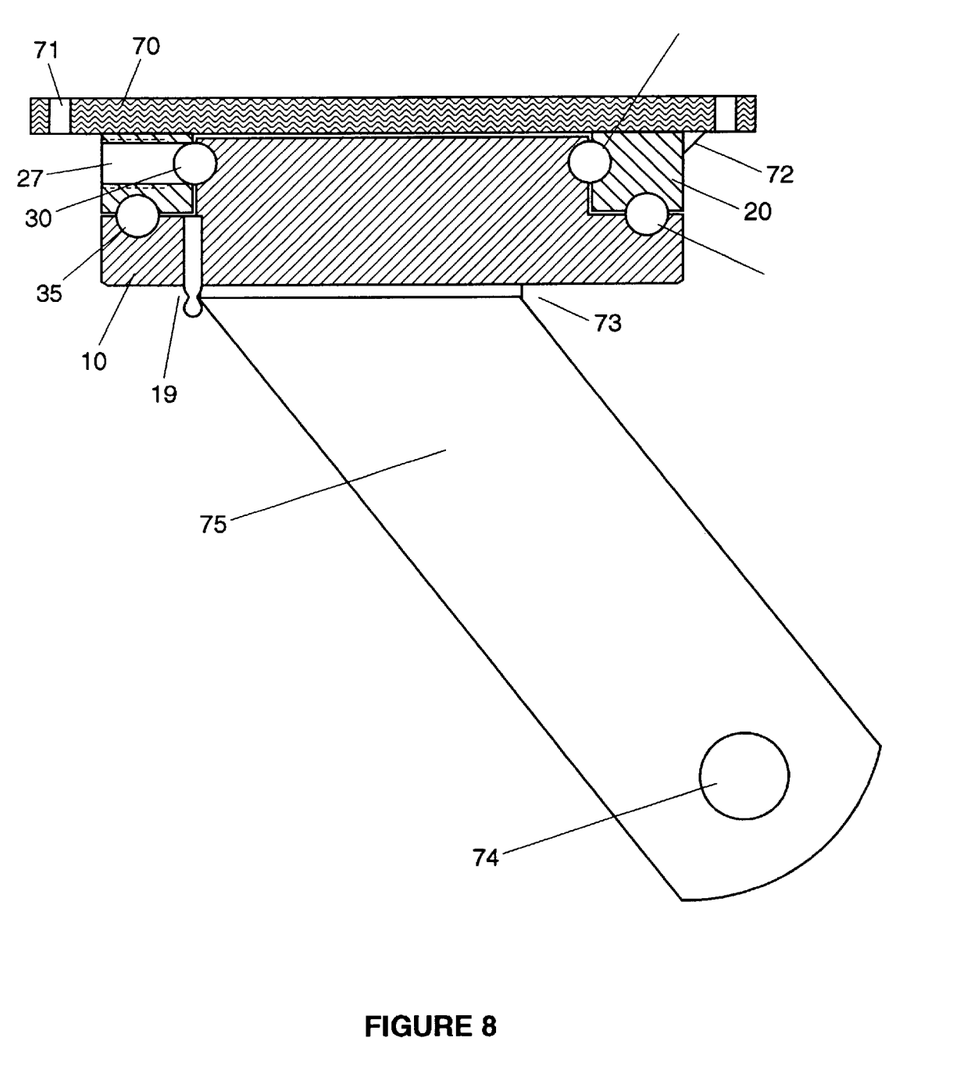
FIG. 8 is a side perspective view of the caster assembly mounted to a top plate and a horn assembly illustrated in a preferred embodiment of the invention.

Further, the ball bearings 30 are provided as swivel bearings. Typically, as best seen in FIG. 8, member 10 is m.i.g. robotically welded to one portion at 73 using #56 wire mild steel based rod, for example, the horn assembly 75 of a wheel (not shown), fixed through opening 74. Member 20 is fastened or similarly welded at 72 to the top plate 70 which may be fixed through openings 71 to a buggy or the like. The load carrying ability therefore of the caster is imposed on ball bearings 35. The swivel ball bearing set 30 is provided separately in onehalf raceways 11/21 which are formed in a substantially vertical plane in use. The raceways 15/25 are formed in a substantial horizontal plane in use. This compact design therefore allows for a multitude of uses.

The material from which the caster assembly is manufactured of a selected material of predetermined resistance to wear and fatigue and in one embodiment being low carbon content steel such as 10/26 or 10/45, which is case hardened in a carbonitriding process. The material is therefore case hardened to 55 c Rockwell hardness after heat treatment. Parts 10 and 20 upon being formed are subjected to the case hardening process such as carbonitriding in order to provide much improved wear resistance and resistance to fatigue. As is well known, ammonia or other nitrogen supplying materials may be added to the furnace atmosphere in order that nitrides may be formed on the surface of the parts 10 and 20 to effect the case hardening. It is estimated that the load-carrying ability of the present design would be up to 30 tons. It is asserted that none of the designs within the prior art cited in the background of the invention would have such a capability because of their lack of resistance to wear. Most of the designs are formed from simple stampings. Heretofore, no caster has been designed which includes the design and features set out above.

The material recommendations for manufacturing parts 10 and 20 are preferably that part 10 is machined from round bar stock such as 12 L 14 free machining steel (includes lead for ease of manufacturing of part 10). Part 20 is preferably manufactured from 10/26 mild steel tube having a ½ inch wall thickness. If stainless steel is required, grades 303 and 304 respectively for parts 10 and 20 are suggested as being free machining and sufficiently malleable when using a carbide tool for ease of chip removal.

The ball bearings may be made from carbon 1000 or stainless steel, being ¼" in diameter. Alternatively, ceramic ball bearings may be used being of suitable comparable performance.

The parts 10 and 20 are preferably formed on a lathe or a machining device under programmable control. This provides for consistent quality assurance from caster to caster.

The following method therefore is applied:

1. selecting the appropriate material such solid-core bar stock for part 10 and tube for part 20, preferably heat treated to achieve suitable hardness, for example of 55 c on the Rockwell scale following the case hardening process,
2. machining a first part 10 from the preferred materials above mentioned, on a point to point numerically programmed unit such as those manufactured by Mayano or Sandvic,
3. machining said first part to include a first portion T1 having a first diameter D1 and a second portion T2 having a second smaller diameter D2 wherein the first portion T1 having the first diameter D1 is disposed proximate one end of the first part 10 and the second portion T2 having the second diameter D2 is disposed from proximate the other end of the first part 10 to the bottom of the first portion T2 of the first part 10,
4. machining a one-half raceway 11 in the second portion T2 of the first part 10 between the ends thereof, (it is recommended to less than ⅛" depth),
5. machining a one-half raceway 15 proximate the bottom of the first portion T1 of the first part 10 intermediate the first and second diameters D1 and D2, (as recommended above),
6. machining the second part 20 from the preferred tube materials and sizing an opening O through the center thereof and thereby forming an inner diameter slightly greater than the smaller diameter D2 of the second portion T2 of the first part 10 so as to allow interfitting of the opening O in the second part 20 with the second portion T2 of the first part 10,
7. forming a one-half annular raceway 25 upon the top of the second part, (to 100 thousandths of an inch depth which when combined with the opposing ½ race 15 of the first part 10 yields a 0.225 inch groove),
8. forming a one-half annular raceway 21 within the material adjacent the inner diameter of the second part 20 intermediate the top and bottom thereof, (to 100 thousandths of an inch in depth, as above mentioned),
9. ensuring that the first and second parts 10 and 20 interfit so that the one-half raceways compatibly combine to form first and second load-bearing 15/25 and swivel-bearing 11/21 raceways, (and to a suggested tolerance of 0.015),
10. drilling and tapping a first opening 17 within the first part 10 through the material thereof to proximate the boundary of the interfitting parts 10 and 20, (it is suggested to form a 0.135 inch hole using a #13 drill bit),
11. threading a grease fitting 19 (substantially 3/16") into the first opening 17 above mentioned, (the suggested grease to be utilized is Shell Ultra Gell Grease for its high heat and low temperature applications),
12. drilling and tapping a second opening 27 into the one-half raceway 21 (5/16" opening course threaded to F.257 opening) formed with the second part 20 within the material adjacent the inner diameter thereof,
13. providing a nyloc plug 40 for said second opening 27,
14. placing ball bearings 35 of predetermined hardness within the one-half race 25 disposed proximate the top of the second part 20,
15. placing the first part 10 within the second part 20 so as to mate the one-half raceways 15/25 previously formed,
16. feeding ball bearings 30 through the second opening 27 into the swivel-bearing raceway 11/21 disposed between the first 10 and second part 20 intermediate the top and bottom of the caster assembly 5,
17. sealing the second opening 27 with the nyloc plug 40, wherein the caster 5 so formed is held together without the need of a pin thereby providing for the much improved load-carrying abilities of the caster 5 with the load-carrying ball bearings 35 and the swiveling ability of the caster with the separate swiveling bearings 30.

The ball bearings 30/35 are ¼" in diameter in the preferred embodiment. The raceways 11/21 and 15/25 are set apart by a horizontal and a vertical differential. Although shown schematically as squared, the raceways are in fact rounded consistent with the requirements of ball bearings with a minimum of burs and edges. The inner and outer diameters D1 and D2 in a preferred embodiment are 3¼" and 2¼". Twenty-eight (28) ball bearings 30 are provided within the race 11/21. Thirty-two (32) ball bearings 35 are provided within the race 15/25.

The assembly 5 of FIG. 8 may then be conveniently mounted to garbage buggies, carts, travelling crane facilities, bogies, skips and other heavy duty applications to realize all of the advantages discussed above.

As many changes can be made to the invention without departing from the scope of the invention, it is intended that all material contained herein be interpreted as illustrative of the invention and not in a limiting sense.

The embodiments of the invention in which an exclusive property or privilege is claimed are as follows:

1. A pinless caster assembly consisting essentially of a first substantially "T"-shaped solid part and a second substantially ring-shaped solid part, said first and second parts interfitting with bearing elements thereby providing the pinless caster assembly, said first and second part being machined from steel bar stock material which is capable of substantial resistance to wear and fatigue, said first part having disposed therewith a first one-half raceway opening disposed substantially in a first plane for receiving load-carrying bearings in use, and a second one-half raceway opening substantially in a second plane disposed at substantially 90 degrees to the first plane for receiving swivel bearings in use, said second part having disposed therewith a third one-half raceway opening substantially in the first plane for receiving load-carrying bearings in use for mating with the first one-half raceway opening disposed with the first part and thereby providing a load-carrying race of the caster assembly, said second part also having disposed therewith a fourth one-half raceway opening substantially in the second plane for receiving swivel bearings in use and for mating with the second one-half raceway opening disposed with the first part and thereby providing a swivel race of the caster assembly, wherein the first and second parts interfit to provide the caster assembly, said caster assembly having provided therewith an opening extending into the swivel race to enable bearings to be loaded into the caster raceway in use, said opening being closed by a closure so as not to interfere with the abilities of the bearings contained within the raceway, the caster assembly so formed having substantial resistance to wear and fatigue as required in heavy duty applications.

2. A pinless caster assembly consisting essentially of a first substantially "T"-shaped solid part and a second substantially ring-shaped solid part, said first and second parts interfitting with bearing elements and when interfit providing races for the bearing elements and the caster assembly, said first and second part being machined from steel bar stock material said first part having disposed therewith a first one-half raceway, for receiving load-carrying bearings in use, and a second one-half raceway for receiving swivel bearings in use, said second part having disposed therewith a third one-half raceway for receiving load-carrying bearings in use for mating with the first one-half raceway disposed with the first part and thereby providing a load-carrying race of the caster assembly, said second part also having disposed therewith a fourth one-half raceway for receiving swivel bearings in use and for mating with the second one-half raceway disposed with the first part and thereby providing a swivel race of the caster assembly, wherein the first and second parts interfit to provide the caster assembly, said caster assembly having provided therewith an opening extending into the swivel race to enable bearings to be loaded into the caster raceway in use, said opening being closed by a closure so as not to interfere with the abilities of the bearings contained within the raceway, wherein the raceway formed from interfitting the first and third one-half raceways disposed with the first and second parts contains the load-carrying bearings for the caster assembly, and wherein the raceway formed from interfitting the second and fourth one-half raceways disposed with the first and second parts contains the swivel bearings for the caster assembly, the caster assembly so formed having substantial resistance to wear and fatigue as required in heavy duty applications.

3. A pinless caster assembly consisting essentially of a first substantially "T"-shaped solid part and a second substantially ring-shaped solid part, said first and second parts interfitting with bearing elements and providing bearing races and the caster assembly, said first and second part being machined from suitable steel bar stock material said first part having a top and a bottom and having disposed proximate the top thereof a first portion having a first diameter and a top end and a bottom end, said first part having disposed therewith extending from proximate the bottom end of the first portion to the bottom of the first part a second portion having a second diameter smaller than the first diameter of the first portion, said first portion having disposed proximate the bottom end thereof intermediate the diameter of the first portion and the diameter of the second portion a one-half raceway extending upwardly from the bottom of the first portion, said second portion having a top end and a bottom end and having disposed intermediate the top end and the bottom end thereof a one-half raceway extending around the circumference of the second portion toward the center of the second portion, said second part having a substantially ring-like configuration having a top, a bottom and an inner and outer diameter, said top of said second part having disposed intermediate its inner and outer diameter an arcuate one-half raceway for mating with the arcuate one-half raceway disposed proximate the bottom end of the first portion of the first part, said second part also having disposed therewith intermediate the top and bottom thereof adjacent the inner diameter thereof and formed at a predetermined location to mate with the one-half raceway of the second portion of the first part, a one-half raceway extending within the material around the interior of the inner diameter of the second part and extending toward the perimeter of the second part, said second part having provided therewith an opening extending from the outer diameter to the inner diameter of the second part and interconnecting with the one-half race provided proximate the inner diameter of the second part to enable bearings to be loaded into the caster raceway in use, wherein the raceways containing the load-carrying bearings for the caster assembly are interfit when the first and second part are assembled, and swivel bearings are loaded through the opening in the second part within the raceway formed by the mating first and second parts, said opening being closed by a closure, so as not to interfere with the abilities of the bearings contained within the swivel raceway, the caster assembly so formed having substantial resistance to wear and fatigue as required in heavy-duty applications.

4. The caster assembly of claim 2 or 3 wherein said "T"-shaped of said first part and said ring shape of said second part are welded to a horn assembly and a top plate respectively.

5. The caster assembly of claim 2 or 3 wherein said first and second parts are machined from solid core bar or tube stock.

6. The caster assembly of claim 5 wherein said first and second parts are heat treated after being formed.

7. The caster assembly of claim 6 wherein said first and second parts undergo case hardening of the surface after being formed by exposing the parts to a carbonitriding process.

8. The caster assembly of claim 2 or 3 wherein said first and second parts are heat treated after being formed.

9. The caster assembly of claim 2 or 3 wherein an opening is drilled and tapped into the first "T"-shaped part of said caster to receive a grease fitting extending into the caster assembly to proximate the second part when interfit with said first part.

10. The caster assembly of claim 2 or 3 wherein said bearings are manufactured from steel resistant to wear and fatigue of compatible hardness with the material from which the caster is manufactured.

11. A pinless caster assembly consisting essentially of a first substantially "T"-shaped solid part and a second substantially ring-shaped solid part, said first and second parts interfitting with bearing elements thereby providing the pinless caster assembly, said first and second part being machined from bar stock selected from the group of materials including steel, ceramics, or engineered plastics, which is capable of substantial resistance to wear and fatigue, said first part having disposed therewith a first one-half raceway opening disposed substantially in a first plane for receiving load-carrying bearings in use, and a second one-half raceway opening substantially in a second plane disposed at substantially 90 degrees to the first plane for receiving swivel bearings in use, said second part having disposed therewith a third one-half raceway opening substantially in the first plane for receiving load-carrying bearings in use for mating with the first one-half raceway opening disposed with the first part and thereby providing a load-carrying race of the caster assembly, said second part also having disposed therewith a fourth one-half raceway opening substantially in the second plane for receiving swivel bearings in use and for mating with the second one-half raceway opening disposed with the first part and thereby providing a swivel race of the caster assembly, wherein the first and second parts interfit to provide the caster assembly, said caster assembly having provided therewith an opening extending into the swivel race to enable bearings to be loaded into the caster raceway in use, said opening being closed by a closure so as not to interfere with the abilities of the bearings contained within the raceway, the caster assembly so formed having substantial resistance to wear and fatigue as required in heavy duty applications.

12. A pinless caster assembly consisting essentially of a first substantially "T"-shaped solid part and a second substantially ring-shaped solid part, said first and second parts interfitting with bearing elements and when interfit providing races for the bearing elements and the caster assembly, said first and second part being machined from bar stock selected from the group of materials including steel, ceramics, or engineered plastics, said first part having disposed therewith a first one-half raceway, for receiving load-carrying bearings in use, and a second one-half raceway for receiving swivel bearings in use, said second part having disposed therewith a third one-half raceway for receiving load-carrying bearings in use for mating with the first one-half raceway disposed with the first part and thereby providing a load-carrying race of the caster assembly, said second part also having disposed therewith a fourth one-half raceway for receiving swivel bearings in use and for mating with the second one-half raceway disposed with the first part and thereby providing a swivel race of the caster assembly, wherein the first and second parts interfit to provide the caster assembly, said caster assembly having provided therewith an opening extending into the swivel race to enable bearings to be loaded into the caster raceway in use, said opening being closed by a closure so as not to interfere with the abilities of the bearings contained within the raceway, wherein the raceway formed from interfitting the first and third one-half raceways disposed with the first and second parts contains the load-carrying bearings for the caster assembly, and wherein the raceway formed from interfitting the second and fourth one-half raceways disposed with the first and second parts contains the swivel bearings for the caster assembly, the caster assembly so formed having substantial resistance to wear and fatigue as required in heavy duty applications.

13. A pinless caster assembly consisting essentially of a first substantially "T"-shaped solid part and a second substantially ring-shaped solid part, said first and second parts interfitting with bearing elements and providing bearing races and the caster assembly, said first and second part being machined from bar stock selected from the group of materials including steel, ceramics, or engineered plastics, said first part having a top and a bottom and having disposed proximate the top thereof a first portion having a first diameter and a top end and a bottom end, said first part having disposed therewith extending from proximate the bottom end of the first portion to the bottom of the first part a second portion having a second diameter smaller than the first diameter of the first portion, said first portion having disposed proximate the bottom end thereof intermediate the diameter of the first portion and the diameter of the second portion a one-half raceway extending upwardly from the bottom of the first portion, said second portion having a top end and a bottom end and having disposed intermediate the top end and the bottom end thereof a one-half raceway extending around the circumference of the second portion toward the center of the second portion, said second part having a substantially ring-like configuration having a top, a bottom and an inner and outer diameter, said top of said second part having disposed intermediate its inner and outer diameter an arcuate one-half raceway for mating with the arcuate one-half raceway disposed proximate the bottom end of the first portion of the first part, said second part also having disposed therewith intermediate the top and bottom thereof adjacent the inner diameter thereof and formed at a predetermined location to mate with the one-half raceway of the second portion of the first part, a one-half raceway extending within the material around the interior of the inner diameter of the second part and extending toward the perimeter of the second part, said second part having provided therewith an opening extending from the outer diameter to the inner diameter of the second part and interconnecting with the one-half race provided proximate the inner diameter of the second part to enable bearings to be loaded into the caster raceway in use, wherein the raceways containing the load-carrying bearings for the caster assembly are interfit when the first and second part are assembled, and swivel bearings are loaded through the opening in the second part within the raceway formed by the mating first and second parts, said opening being closed by a closure, so as not to interfere with the abilities of the bearings contained within the swivel raceway, the caster assembly so formed having substantial resistance to wear and fatigue as required in heavy-duty applications.

\* \* \* \* \*